US008422652B2

(12) United States Patent
Bouvier et al.

(10) Patent No.: US 8,422,652 B2
(45) Date of Patent: Apr. 16, 2013

(54) DEVICE AND METHOD FOR MANAGING COMMUNICATION CREDITS ASSOCIATED TO USE OF SERVICES BY A TERMINAL

(75) Inventors: Hervé Bouvier, Les Pennes Mirabeau (FR); Jacques Lecourvoisier, Meylan (FR); Julien Grosso, Marseille (FR)

(73) Assignee: France Telecom, Paris (FR)

( * ) Notice: Subject to any disclaimer, the term of this patent is extended or adjusted under 35 U.S.C. 154(b) by 1140 days.

(21) Appl. No.: 11/922,966

(22) PCT Filed: Jun. 23, 2006

(86) PCT No.: PCT/FR2006/050622
§ 371 (c)(1),
(2), (4) Date: Oct. 31, 2008

(87) PCT Pub. No.: WO2006/136759
PCT Pub. Date: Dec. 28, 2006

(65) Prior Publication Data
US 2009/0092238 A1 Apr. 9, 2009

(30) Foreign Application Priority Data

Jun. 23, 2005 (FR) ..................................... 05 06416

(51) Int. Cl.
*H04M 15/00* (2006.01)
*H04L 12/46* (2006.01)
*G06Q 40/00* (2006.01)
(52) U.S. Cl.
USPC ...... 379/114.05; 235/375; 235/379; 235/492; 341/50; 379/88.01; 379/114.2; 455/405; 455/406; 455/407; 455/408; 455/432.1; 705/26.1; 705/35; 705/38; 705/39; 705/41; 709/206
(58) Field of Classification Search .................. 235/492, 235/375, 379; 379/114.05, 88.01, 114.2; 455/406, 407, 408, 405, 432.1; 705/35, 26.1, 705/26.7, 38, 39, 41; 341/50; 709/206
See application file for complete search history.

(56) References Cited

U.S. PATENT DOCUMENTS

| 5,109,401 | A | * | 4/1992 | Hattori et al. ................. 455/407 |
| 6,070,067 | A | * | 5/2000 | Nguyen et al. ................ 455/407 |
| 6,332,579 | B1 | * | 12/2001 | Ritter ............................ 235/492 |
| 6,526,273 | B1 | * | 2/2003 | Link et al. .................... 455/406 |
| 6,934,530 | B2 | * | 8/2005 | Engelhart .................... 455/406 |
| 7,120,419 | B2 | * | 10/2006 | Batni et al. .................... 455/406 |
| 7,324,816 | B2 | * | 1/2008 | Sherman et al. ........... 455/432.1 |
| 7,599,887 | B1 | * | 10/2009 | Short ............................. 705/41 |
| 7,680,712 | B2 | * | 3/2010 | Thomson et al. ............. 705/35 |
| 7,729,484 | B1 | * | 6/2010 | Coppage .................. 379/114.2 |
| 7,848,734 | B2 | * | 12/2010 | Engelhart .................... 455/406 |

(Continued)

FOREIGN PATENT DOCUMENTS

| EP | 1 465 399 | 10/2004 |
| EP | 1 560 448 | 8/2005 |

*Primary Examiner* — Gerald Gauthier
(74) *Attorney, Agent, or Firm* — Knobbe Martens Olson & Bear LLP

(57) ABSTRACT

This client device (20) is able to use a service on a telecommunications network (1). It includes means (21) for storing a call credit (C_S1, C_S2) associated with that service and means (30) for updating that credit as a function of the use of that service by the client (20) on reception of a request from a service provider (FS1, FS2).

9 Claims, 2 Drawing Sheets

U.S. PATENT DOCUMENTS

| | | |
|---|---|---|
| 7,853,511 B2 * | 12/2010 | Titus et al. .................. 705/36 R |
| 7,890,422 B1 * | 2/2011 | Hirka et al. ...................... 705/39 |
| 8,020,754 B2 * | 9/2011 | Schwarz, Jr. .................. 235/375 |
| 8,027,660 B2 * | 9/2011 | McQuaide et al. ............ 455/406 |
| 8,060,057 B2 * | 11/2011 | Espejo et al. ................. 455/406 |
| 8,078,528 B1 * | 12/2011 | Vicente et al. .................. 705/38 |
| 8,090,343 B2 * | 1/2012 | Kazmi .......................... 455/405 |
| 8,090,344 B2 * | 1/2012 | Hamadi et al. ................ 455/405 |
| 8,095,459 B2 * | 1/2012 | Noles .............................. 705/38 |
| 8,145,549 B2 * | 3/2012 | Das ................................. 705/35 |
| 8,239,304 B1 * | 8/2012 | Ahmad ........................ 705/26.7 |
| 8,239,323 B2 * | 8/2012 | Cleary et al. ..................... 705/41 |
| 8,245,909 B2 * | 8/2012 | Pletz et al. ..................... 235/379 |
| 8,306,907 B2 * | 11/2012 | Das ................................. 705/38 |
| 2003/0027549 A1 | 2/2003 | Kiel et al. |
| 2003/0120553 A1 * | 6/2003 | Williams ........................ 705/26 |
| 2004/0253941 A1 * | 12/2004 | Rivera et al. .................. 455/408 |
| 2009/0092238 A1 * | 4/2009 | Bouvier et al. .......... 379/114.05 |

* cited by examiner

DEVICE AND METHOD FOR MANAGING COMMUNICATION CREDITS ASSOCIATED TO USE OF SERVICES BY A TERMINAL

RELATED APPLICATIONS

This is a U.S. National Phase Application under 35 USC 371 of International Application PCT/FR2006/050622, filed on Jun. 23, 2006.

This application claims the priority of French application no. 05/06416 filed Jun. 23, 2005 the entire content of which is hereby incorporated by reference.

BACKGROUND OF THE INVENTION

The present invention relates to the general field of managing call credits associated with the use of services by terminals.

The context of the invention is more particularly that in which a client device solicits the use of a service on a telecommunications network from a provider of that service.

In the present document, the concept of "service" is to be understood in a broad sense. It covers in particular fixed or mobile telephone services in which a first party sets up a call with a second party via the network. Either or both of the parties can be a service platform.

The concept of service also covers all Internet site access applications, for example for downloading content.

These services have the common feature of using resources of a telecommunications network.

As is known in itself, the use of these resources is billed to the client, for example by the operator of the network or a service platform. To this end, each user or client has a call credit associated with certain uses, this credit being expressed in a specific unit, for example kilobytes for downloading data or time units for telephone calls.

The person skilled in the art also knows this call credit as a "pot" ("godet" in French).

Of course, there can be more than one pot for the same use. For example, with a downloaded game, there can be one pot for the volume downloaded and another pot for the unit cost of the game.

When a client device solicits a service, the telecommunications network allocates it certain resources, which are released when the associated service has been rendered, for example at the end of a telephone call or after downloading a file.

During use, or on releasing the aforementioned network resources, details of the call grouped under the known designation "usage ticket" are recovered and processed by specific components of the communication network with a view to "pricing" the service.

Pricing associates with a use, details of which are given by the usage ticket, a monetary value that generally depends on charging rules of the client's subscription.

Usage tickets associated with a client can be priced as and when they are collected (this is known as "real time" pricing), once a day, or in batches (this is known as "batch" pricing).

As is known in itself, pricing a usage ticket updates the pot or pots relating to that type of use. For example, if a client sends an SMS message, a pot associated with SMS sending is updated, to be more precise decremented by a certain number of units, commensurately decreasing the call credit for sending future SMS messages.

The pots are stored in the centralized information system of the telecommunication operator and managed by centralized pricing software.

This centralized approach gives rise to a certain number of problems, in particular for pricing usage tickets in real time, such processing having to guarantee that the processing time running from the issuing of the usage ticket is limited and minimal, typically less than one second.

Clearly the centralized real-time approach has limitations in terms of performance, especially if the volume of usage tickets increases exponentially, a situation that is very likely to occur with the expansion of high-content services deployed over high-bit-rate networks such as UMTS, ADSL and EDGE networks.

In fact, on each content request, a first ticket is issued for setting up the call, i.e. for the content transport service, and one or more second tickets for obtaining the content as such.

Centralizing the real-time processing of usage tickets in ever greater numbers will inevitably generate increasing costs in terms of calculation and memory resources for operators. Associated with this explosion in demand, it will also be more and more difficult to guarantee real time processing of usage tickets within a limited time.

OBJECT AND SUMMARY OF THE INVENTION

Thus an object of the present invention is to alleviate such drawbacks.

To this end, it proposes a client device adapted to use a service on a telecommunications network, including means for storing a call credit associated with the service and means for updating the credit as a function of the use of the service by the client.

According to an embodiment of the invention, call credits are managed in the client devices rather than in a centralized manner by the telecommunication operator. This management task is therefore distributed between the user terminals.

This addresses the problem that gave rise to the invention, namely guaranteeing real-time processing of usage tickets within a limited time, even with a large increase in the number of tickets.

For example, subject to the agreement of the hardware supplier, the call credit manager associated with a service can be pre-installed in the terminal of a user, for example a mobile telephone.

The client device according to an embodiment of the invention includes means for receiving a request to update the call credit from a provider of the service and means for sending a response representing the effective updating of the call credit prior to use of the service.

This feature is particularly advantageous when the cost of using a service is a fixed charge.

In a preferred embodiment, the client device includes means for creating a call credit associated with a service for which it does not manage or no longer manages call credits and means for receiving from a server an initial call credit associated with that service.

For example, the credit manager can be downloaded on the premises of an operator via an infrared port, a USB connection or a Bluetooth connection.

Alternatively, the credit manager can be downloaded by logging onto a server of the operator, for example via the Internet.

Alternatively, the client device can include means for receiving a message, for example an MMS or electronic mail message, the message including means for automatically installing the call credit manager associated with a particular service.

The client device according to the invention preferably includes means for sending to a server a request to increase the call credit and the updating means are adapted to increase the credit on reception of a positive response to the request from the server.

In a correlated way, an embodiment of the invention relates to a server adapted to provide a service accessible by a client device as defined above, the server including means for sending the client device a request to update a call credit associated with the use of the service by the client device and means for receiving from the client device a response representing the effective updating of the call credit, the response constituting a condition necessary for the use of the service by the client device.

The client can send this request when the call credit associated with a service being used reaches zero or falls below a predetermined threshold, for example.

The call credit updating means preferably apply one or more updating rules specific to the service and/or to the user of the client device.

The updating rules are generally part of the subscription of the user of the client device with an operator or service provider.

In one particular embodiment, the client device according to the invention further includes means for evaluating by itself the use of the service, the call credit being updated on the basis of this evaluation.

Thus the operator or the service provider is not contacted to measure or evaluate the use of a service.

In one particular use of the invention, the user benefits from a special offer based on the value of one or more pots. For example, a pot is used to count SMS messages sent and a free SMS message is offered for every ten SMS messages sent.

Another aspect of the invention is directed to a call credit management method usable in a client device seeking to use a service on a telecommunications network, the method comprising:
- a step of storing in the client device a call credit associated with the use of the service;
- a step of receiving from a service provider a request to update the call credit;
- a step of updating the call credit as a function of the use of the service by the client; and
- a step of sending a confirmation response to the service provider.

In a preferred implementation, the steps of the management method are determined by computer program instructions.

Another aspect of the invention is directed to a computer program on an information medium, adapted to be executed in a computer, and including instructions for implementing the above management method.

This program can use any programming language and take the form of source code, object code or an intermediate code between source code and object code, such as a partially compiled form, or any other desirable form.

Another aspect of the invention is directed to a computer-readable information medium containing instructions of the above computer program.

The information medium can be any entity or device capable of storing the program. For example, it can include storage means such as a ROM, for example a CD ROM or a microelectronic circuit ROM, or magnetic storage means, for example a diskette (floppy disk) or a hard disk.

Moreover, the information medium can be a transmissible medium such as an electrical or optical signal which can be routed via an electrical or optical cable, by radio or by other means. The program according to the invention can in particular be downloaded over an Internet-type network.

Alternatively, the information medium can be an integrated circuit incorporating the program and adapted to execute the method in question or to be used in its execution.

The client device of the invention is preferably included in a terminal able to use a plurality of services on the telecommunications network. It can then be used to send to servers providing access to those services messages that are independent of each other and are processed by the servers to authorize or refuse access to those services. The messages are established by the client device as a function of call credits associated with the services, the client device managing and storing the credits.

DETAILED DESCRIPTION OF THE DRAWINGS

Figure 1:
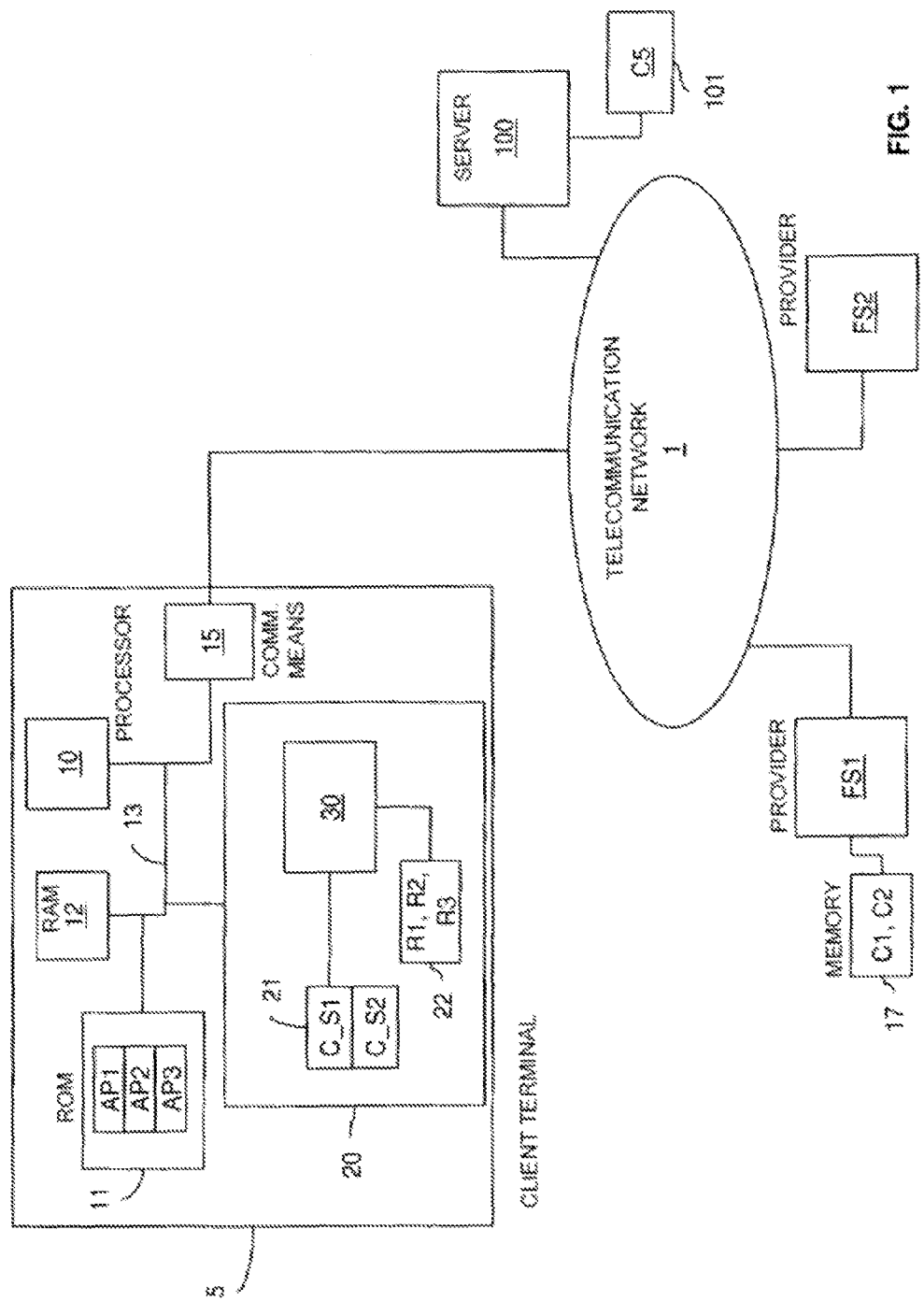
FIG. 1 represents a preferred embodiment of a client device according to the invention, shown in its environment.

FIG. 1 shows a terminal 5 connected to a telecommunications network 1.

In the example described here, the terminal 5 is a mobile telephone and the telecommunications network 1 is the UMTS network.

The terminal 5 includes a processor 10, a read-only memory (ROM) 11, in which application programs AP1, AP2, AP3 are stored, and a random-access memory 12 for storing variables necessary for executing the programs.

In the example described here:
- the program AP1 is a networked game program;
- the program AP2 is an application for sending and receiving SMS messages; and
- the application program AP3 is a program for downloading music files.

The mobile equipment 5 also includes communication means 15 known in themselves for sending and receiving data in accordance with the UMTS protocol.

Two service providers FS1 and FS2 in the network 1 are also shown.

The service provider FS1 supplies the client 5 with a networked game service and music files.

In the remainder of the description it is assumed that the provider FS1 includes a memory 17 in which the following costs are stored:
- C1: game action: one unit (or token); and
- C2: new level: two units.

In the example described here, the service provider FS2 is an operator of the network 1 implementing an SMS messaging service.

The terminal 5 includes a client device 20 according to the invention for managing call credits associated with the networked game service, the SMS service and the music downloading service.

In the example described here, it is assumed that the device 20 manages a first call credit C_S1 associated with networked gaming services and downloading music and a second call credit C_S2 associated with sending SMS messages.

In the example described here, the two call credits C_S1, C_S2 are stored in a first non-volatile memory 21 internal to the client device 20.

The call credits could instead be stored in a non-volatile memory of the terminal 5.

According to the invention, the client device 20 includes means 30 for managing the two call credits C_S1 and C_S2 as a function of the use of the above services.

The management means 30 are in particular adapted to update the call credits C_S1 and C_S2 and to create a call credit associated with a service for which the client device 20 does not manage the call credit or no longer manages it.

The processor 10, the read-only memory 11, the random-access memory 12, the communication means 15, and the client device 20 are interconnected by a bus 13 known to the person skilled in the art.

It is assumed that the means 30 for updating call credits were pre-installed in the terminal 5 at the time of its purchase by the user.

It is further assumed that the call credit C_S2 associated with the SMS services was initialized with a credit of five pots.

The client device 20 also includes a second non-volatile memory 22 in which are stored two rules R1, R2 for updating the call credit CS_2:
  R1: decrement CS_2 by one unit for sending an SMS message;
  R2: increase CS_2 by two units after sending ten SMS messages; and a rule R3 for updating the call credit CS_1:
  R3: music downloads: two units.

In this figure, a server 100 has the main function of providing units to the terminal 5 for using services in the network 1, those units being managed by the client device 20 to increment the call credits CS_1 and CS_2.

In the preferred embodiment described here, the server 100 assigns units to the terminal 5 as a function of an account C5 associated with that terminal. The account C5 can be topped up by the user of the terminal 5, for example subject to a payment.

Figure 2:
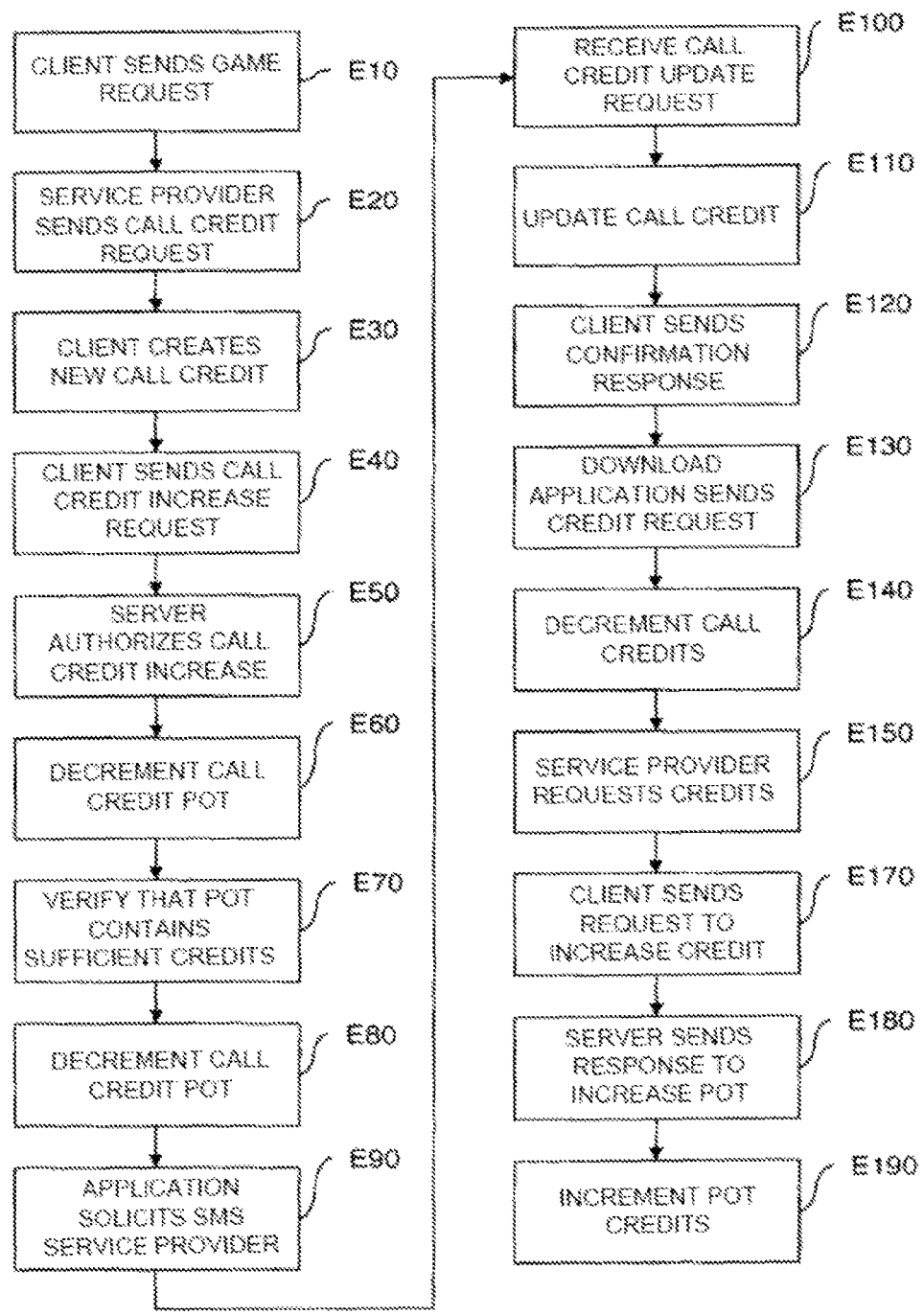
FIG. 2 represents the main steps of a scenario for using the client device from FIG. 1.

A scenario for use of the terminal 5 is described next with reference to FIG. 2.

It is assumed in this scenario that the user of the terminal 5 wishes to play a networked game, to which end the user starts the application AP1 on the terminal. During a first step E10 of this scenario, this application solicits the network provider FS1, via the communication means 15 of the terminal, sending it a game request.

It is assumed that, on reception of this game request, the service provider FS1 authenticates the terminal 5 and registers it on its platform so that this terminal is known to the other players.

It is assumed that the user of the terminal 5 begins to play, effecting a certain number of actions of the game, and that one of these actions requires the expenditure of one unit, in accordance with the cost C1 set by the service provider FS1.

In the example described here, the service provider FS1 claims this unit by sending a request to the client device 20 during a step E20.

Given that the client device 30 is not managing call credits associated with the networked game service at this time, the manager 30 of the client device 20 creates a new call credit C_S1 associated with that service during a step E30.

This call credit creation step E30 is followed by a step E40 during which the client device 30 sends the server 100 a request to increase the call credit associated with the networked game service.

It is assumed here that the state of the account C5 enables the server 100 to respond positively to this request. The server 100 sends a response authorizing the credit manager 30 to increase the call credit C_S1 by five units, this response being received in the step E50. During this same step the server 100 decrements the value C5 by five units.

The pot C_S1 is therefore decremented by one unit (cost C1) during a step E60. After this step, the call credit C_S1 is therefore four units. During the same step E60, the client device 20 sends a confirmation message to the service provider FS1, representing the fact that the credit CS_1 has been updated. The service provider FS1 therefore authorizes continuation of the game.

The step E60 is followed by a gaming step proper.

It is assumed that access to a new level of the game requires two units (cost C2). The credit manager 30 therefore verifies, in a step E70, that the pot C_S1 associated with the networked game contains sufficient units, in this instance at least two units. Since it does, the credit manager 30 then decrements the pot C_S1 during a step E80. The credit C_S1 now includes two units. During this same step E80, the client device 20 sends a confirmation message to the service provider FS1, representing the fact that the credit CS_1 has been updated. The service provider FS1 therefore authorizes continuation of the game.

It is assumed below that the user of the terminal 5 wishes to send an SMS message to another player whose nickname he or she has obtained during the game.

To this end, during a step E90, the application AP2 solicits the SMS service provider FS2. Before rendering the SMS service, the service provider FS2 sends the client device a request to update the call credit associated with the SMS service. This request is received by the credit manager 30 during a step E100.

On reception of this request, the credit manager 30 decrements the pot C_S2 by one unit in accordance with the updating rule R1 (step E110).

The step E110 of updating the credit C_S2 is followed by a step E120 in which the client device 20 according to the invention sends a confirmation response to the service provider FS2.

On reception of this confirmation message, the service provider FS2 routes the SMS message from the client terminal 5 to its destination.

It is assumed now that the user of the client device 5 wishes to purchase a tune available from the service provider FS1.

To this end, during a step E130, the downloading application AP3 sends a request to the service provider FS1. In this example, the device 20 according to the invention manages the updating of the call credit associated with downloading music itself, in accordance with the rule R3, i.e. by decrementing the call credit C_S1 by two units during a step E140.

After this step E140, the pot C_S1 is empty.

During this same step E140, the client device 20 sends a confirmation message to the service provider FS1, representing the fact that the credit CS_1 has been updated. The service provider FS1 consequently allows downloading of the tune.

It is assumed now that the terminal 5 receives the tune from the service provider FS1 while the user continues to play and the service provider FS1 requests an additional unit for a new game action (cost C1) during a step E150.

As previously noted, the pot C_S1 is empty at this time.

Consequently, the manager 30 sends the service provider 100 a request to increase the call credit (E170).

Here the server 100 decrements the account C5 of the terminal 5 and sends the manager 30 a response representing agreement to increase the credit of the pot C_S1 by five units (step E180).

On reception of this positive response, the means for updating the pot C_S1 add five units to the pot (step E190) and then decrement the same pot by one unit so that the service request is processed (rule C1). The pot C_S1 then contains four units.

During this same step E190, the client device 20 sends a confirmation message to the service provider FS1 representing the fact that the credit C_S1 has been updated. The service provider FS1 consequently authorizes the execution of a new game action.

When the client stops playing, the value of the pots C_S1, C_S2 is retained in the non-volatile memory 21.

In the example described here, the terminal 5 is a mobile telephone. The invention can also be used regardless of the type of terminal (personal computer, fixed telephone, etc.). The invention applies in particular to terminals adapted to implement the Session Initiation Protocol (SIP) and to domestic gateways.

The invention is not limited to client-to-client usage but also covers client-server type applications.

The invention claimed is:

1. A client device (20) adapted to use a service on a telecommunications network (1), including means (21) for storing a call credit (C_S1, C_S2) associated with said service and means (30) for updating said credit as a function of the use of said service by said client (20), wherein the client device includes means (15) for receiving a request to update said call credit (C_S1) from a provider (FS1, FS2) of said service and means (15) for sending a response to the provider of said service, the response representing the effective updating of said call credit (C_S1) prior to use of said service.

2. The client device according to claim 1, comprising means (30) for creating a call credit (C_S2) associated with a service for which it does not manage or no longer manages call credits and means for receiving from a server (100) an initial call credit associated with that service.

3. The client device according to claim 1, comprising means (15) for sending to a server (100) a request to increase said call credit and in that said updating means (30) are adapted to increase said credit (C_S1) on reception of a positive response to said request from said server (100).

4. The client device according to claim 1, wherein said updating means (30) apply an updating rule (R1-R3) specific to said service and/or to the user of said client (20).

5. The client device according to claim 1, comprising means for evaluating, by itself, use of said service and the updating means (30) use the result of said evaluation to update said call credit.

6. A server (FS1, FS2) adapted to provide a service accessible by a client device (20) according to claim 1, comprising means for sending the said client device (20) a request to update a call credit (C_S1, C_S2) associated with the use of said service by said client device and means for receiving from said client device a response representing the effective updating of said call credit, said response constituting a condition necessary for the use of said service by said client device.

7. Use of a client device (20) according to claim 1, included in a terminal (5) able to use a plurality of services on a telecommunications network (1) to send servers (FS1, FS2) providing access to those services messages that are independent of each other and are processed by said servers to authorize or refuse access to said services as a function of call credits (CS_1, C_S2) that are associated with said services and managed and stored by said client device (20).

8. A call credit management method usable in a client device seeking to use a service on a telecommunications network comprising the steps of:
  storing in said client device a call credit associated with the use of said service;
  receiving from a service provider (FS2) a request to update said call credit;
  updating said call credit as a function of the use of said service by said client; and
  sending a confirmation response to said service provider (FS2).

9. A computer-readable storage medium on which is stored a computer program including instructions for executing the steps of the management method according to claim 8.

* * * * *

UNITED STATES PATENT AND TRADEMARK OFFICE
CERTIFICATE OF CORRECTION

PATENT NO. : 8,422,652 B2  
APPLICATION NO. : 11/922966  
DATED : April 16, 2013  
INVENTOR(S) : Bouvier et al.

Page 1 of 1

It is certified that error appears in the above-identified patent and that said Letters Patent is hereby corrected as shown below:

In the Specification

In column 5 at line 21, Change "CS_2:" to --C_S2:--.
In column 5 at line 22, Change "CS_2" to --C_S2--.
In column 5 at line 24, Change "CS_2" to --C_S2--.
In column 5 at line 26, Change "CS_1:" to --C_S1;--.
In column 5 at line 31, Change "CS_1 and CS_2." to --C_S1 and C_S2.--.
In column 6 at line 7, Change "CS_1" to --C_S1--.
In column 6 at line 20, Change "CS_1" to --C_S1--.
In column 6 at line 53, Change "CS_1" to --C_S1--.

In the Claims

In column 8 at line 22, In Claim 7, change "(CS_1, C_S2)" to --(C_S1, C_S2)--.

Signed and Sealed this  
Twelfth Day of November, 2013

Teresa Stanek Rea  
*Deputy Director of the United States Patent and Trademark Office*